United States Patent [19]

Rizzi et al.

[11] 3,733,690

[45] May 22, 1973

[54] DOUBLE JUNCTION READ ONLY MEMORY AND PROCESS OF MANUFACTURE

[75] Inventors: Joseph D. Rizzi, Los Gatos; Lloyd D. Fagan, Santa Clara, both of Calif.

[73] Assignee: Intersil Incorporated, Cupertino, Calif.

[22] Filed: Dec. 14, 1970

[21] Appl. No.: 97,492

Related U.S. Application Data

[63] Continuation-in-part of Ser. No. 54,531, July 13, 1970, abandoned.

[52] U.S. Cl. ....................................... 29/577, 29/584

[51] Int. Cl. ............................................. B01j 17/00

[58] Field of Search .................. 317/235 AJ; 29/584, 29/585, 586, 577; 340/173 SP

[56] References Cited

UNITED STATES PATENTS 3,641,516 2/1972 Castrucci et al. ............... 340/170 SP

*Primary Examiner*—Charles W. Lanham

*Assistant Examiner*—W. C. Tupman

*Attorney*—Gregg, Hendricson & Caplan

[57] ABSTRACT

An integrated circuit READ ONLY MEMORY matrix having back-to-back PN junctions between each intersection of rows and columns. One junction of selected connections are electrically shorted to program the ROM by establishing single diode or junction connections at predetermined intersections. Electrical shorting is accomplished by causing ohmic contact material to migrate along the surface of semiconductor material by the selective application of electrical power to establish a low resistance current path between such contacts.

2 Claims, 9 Drawing Figures

INVENTORS
JOSEPH D. RIZZI
LLOYD D. FAGAN
BY
Gregg, Hendricson & Caplan
ATTORNEYS INVENTORS.
JOSEPH D. RIZZI
LLOYD D. FAGAN
BY
Gregg, Henderson & Caplan
ATTORNEYS

DOUBLE JUNCTION READ ONLY MEMORY AND PROCESS OF MANUFACTURE

This is a continuation-in-part of prior copending U.S. Pat. application Ser. No. 54,531 filed in the U.S. Pat. Office on July 13, 1970 for "Electrically Alterable Read Only Memory Unit and Process of Manufacture," and now abandoned.

BACKGROUND OF INVENTION

In the general classification of memory devices and circuits there has been developed what is commonly termed a READ ONLY MEMORY, hereinafter abbreviated ROM, in which information is permanently located so as to be available to the user. In addition to auxiliary circuitry the ROM comprises a matrix of what may be termed rows and columns of electrical conductors having variable resistance devices such as diodes connecting selected intersections of rows and columns. This type of memory device comprises a fixed memory which is not adapted to receive additional information nor to be altered once it has been programmed.

Although it is possible to form a diode matrix for an ROM or the like in a variety of ways, it has been found advantageous to produce the matrix as a single integrated circuit. According to conventional practice a particular program of information is employed in the manufacture of the integrated circuit and this requires separate masking operations for each different ROM. While the resultant product is highly advantageous this process has the disadvantages of substantial cost and also of substantial manufacturing time.

It has been recognized that it would be highly advantageous to be able to manufacture a diode matrix that could subsequently be operated upon to fix the conducting paths therein in accordance with separate programs for different ROMs. This would have the advantage of allowing each matrix to be manufactured identically and the process should then provide for a relatively simple electrical operation to establish the desired conductive paths in the matrix. Along this line there has been developed a process in which all intersections in the matrix are provided with a diode with each diode being connected through such as a Nichrome wire or the like which acts as a fuse so that upon the passage of a large current therethrough the wire is melted to disconnect selected diodes in the matrix. One disadvantage of this approach is the cost of manufacture.

The present invention provides for the production of identical matrices for all ROMs of the same size. Programming of individual ROMs is then accomplished by producing surface conducting paths across one of the two PN junctions at selected intersections of rows and columns in accordance with any desired program. Instead of forming a diode matrix, the present invention provides for the formation of what may be termed a transistor matrix in that each intersection has two back-to-back PN junctions formed thereacross. In practice each of these connections may be physically formed as a transistor with the emitter-base junction and base-collector junction in series connection between row and column. The matrix blank may be provided with a base connection for each transistor and any desired information may be readily stored in the matrix by applying an overvoltage or voltage in excess of junction rating between the base and either collector or emitter contacts of selected transistors. This then causes a failure or shorting of one of the junctions to thus leave only a single junction connected across the intersection of a particular row and column to thus provide the equivalent of a diode connection.

SUMMARY OF INVENTION

There is provided by the present invention a process of manufacturing integrated circuit READ ONLY MEMORY matrices with the subsequent establishment of individual programs in different matrices by the application of electrical signals to the matrices. Manufacturing is accomplished by the diffusion of a pair of back-to-back PN junctions or diodes at each intersection of electrically conducting rows and columns of the matrix. Insertion of information into a matrix is herein accomplished by operation upon the manufactured matrix blank through the application of electrical voltage across one junction in a reverse bias direction to electrically short such junction. This information or program may be readily and rapidly applied to a matrix without prior art requirement of separate masking for different matrices.

More generally the present invention is adapted to electrically produce an electrical connection between selected ohmic contacts at the surface of an integrated circuit device. This connection or electrical short is formed of ohmic contact metal extending, for example, beneath a protective oxide coating upon a device surface and may be formed by the application of sufficient electrical energy to the desired shorting path. Thus in the case of electrical shorting of the base-emitter junction of a transistor it is possible with a proper device configuration to apply a voltage between emitter and collector to dissipate sufficient power between emitter and base contacts to establish the desired electrical short. Whereas transistors have been discussed above, integrated circuit resistors and other power dissipating elements may also be shorted in accordance with this invention.

DESCRIPTION OF FIGURES

The present invention is illustrated as to particular preferred embodiments thereof in the accompanying drawings wherein.

DESCRIPTION OF PREFERRED EMBODIMENTS

Figure 1:
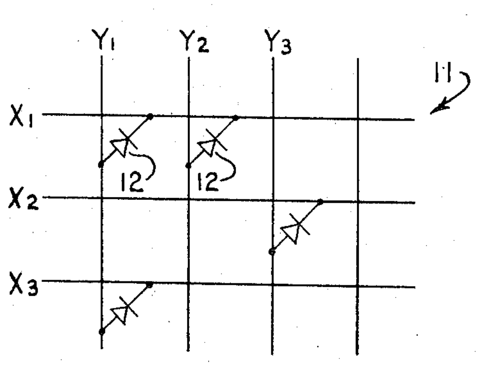
FIG. 1 PRIOR ART
FIG. 1 is an illustration of a prior art diode matrix.

Reference is first made to FIG. 1 of the drawings illustrating a conventional diode matrix. The matrix is comprised as a plurality of rows of electrical conductors $X_1$, $X_2$, $X_3$, etc., and the plurality of columns of electrical conductors $Y_1$, $Y_2$, $Y_3$, etc., which are electrically separate from the rows. Diodes 12 are connected across desired intersections of rows and columns to complete a connection between the particular row and column at such an intersection. Information may be stored in this type of matrix as, for example, by considering the diode connection between $X_1$ and $Y_1$ as a binary 1 and a lack of connection between $Y_1$ and $X_2$ as a binary zero.

Figure 2:
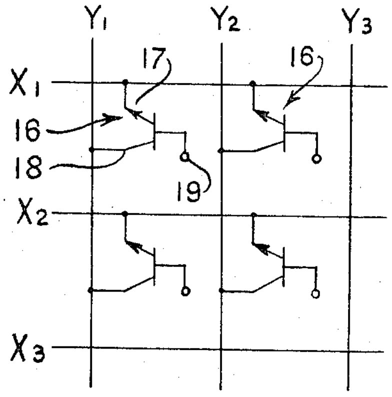
FIG. 2 is an illustration of a matrix blank in accordance with the present invention and illustrated in terms of transistors.

The present invention provides an integrated circuit matrix with a pair of back-to-back PN junctions or what is herein termed a transistor connected across each intersection, as indicated at FIG. 2. Each transistor 16 has the emitter 17 thereof connected to a row and the collector 18 thereof connected to a column, or vice versa. The transistor base connection 19 is not connected to either rows or columns. It will be appreciated that a transistor is in fact a pair of back-to-back PN junctions which thus prevents the passage of current within the operating voltage range of the circuit. The present invention provides for shorting one of these junctions for selected transistors to thus leave but a single PN junction at desired matrix intersections to thereby produce the electrical equivalent of the diode matrix in FIG. 1.

Figure 3:
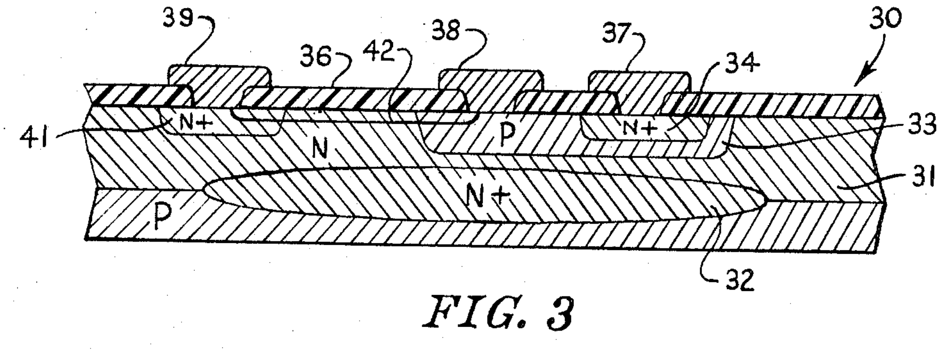
FIG. 3 is a transverse sectional view through a single transistor of the present invention and illustrating conventional locations of portions of a matrix in accordance with this invention.

Referring to FIG. 3, there will be seen to be schematically illustrated, in section, a single transistor of an integrated circuit transistor matrix in accordance with the present invention. A single transistor 30 is shown in FIG. 3 as including an N+ buried collector region 32 within the body of silicon and disposed below an N type collector region 31, at the top of which there is formed a P type base region 33 with an N+ emitter region 34 therein. An oxide coating 36 insulates the upper surface of the silicon and overlies the PN junctions thereat. Openings are provided through the oxide layer 36 for an emitter contact 37, a base contact 38 and a collector contact 39. In common with conventional practice there is shown to be provided an N+ collector contact region 41. The N+ buried collector region 32 is used to provide a low resistance path between the collector contact region 41 and the base-collector junction between regions 31 and 33. The transistor illustrated schematically in FIG. 3 is conventional and may be formed by conventional techniques.

Figure 4:
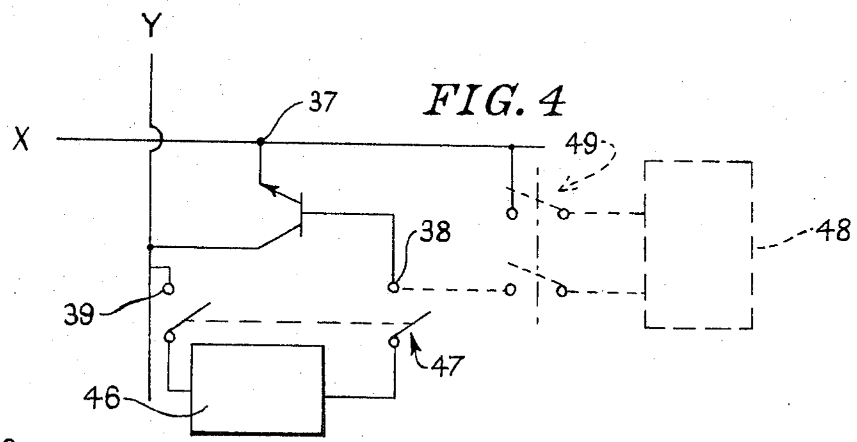
FIG. 4 is an illustration of a single transistor connection between rows and columns of a matrix with connections for carrying out the process of the present invention.

Programming of transistors of the matrix such as the transistor illustrated in FIG. 3 may be accomplished as schematically illustrated in FIG. 4 wherein the row X represents a common connection for emitter contacts 37 of a plurality of transistors and the column Y represents a common connection of collector contacts 39 of a different plurality of transistors. In accordance with the present invention one of the junctions of selected transistors such as the transistor illustrated in FIG. 4 is electrically shorted and this is shown to be accomplished by the connection of a power supply 46 across the base and collector contacts 38 and 39 respectively. The power supply connection is illustrated to be accomplished by means of a switch 47 as an indication of the removable nature of the connection. Application of a voltage substantially in excess of the rated reverse bias voltage of the base-collector junction will cause what may be termed a surface short 42 across the upper surface of the semi-conducting material beneath the oxide coating 36 to thus effectively connect together the base and collector contacts. This surface connection 42 is formed of the ohmic contact material of contacts 38 and 39, such as, for example, aluminum or gold. This material actually extends somewhat as indicated between the contacts 38 and 39 as a low resistance current path. Following application of this voltage there will thus remain in the circuit only the base-emitter junction as a single junction or diode connecting the intersection of X and Y.

Alternatively it is possible in accordance with the present invention to electrically short the base-emitter junction, as schematically illustrated by the power supply 48 connected by means of a switch or the like 49 between the base contact 38 and emitter contact 37. Application of a sufficient voltage between these contacts will cause what is termed a surface short across the top of the transistor between the emitter contact and base contact beneath the oxide coating to thus effectively short out the base-emitter junction. This will then leave only the base-collector junction in the circuit. It is to be noted that there is stated above the alternatives of shorting either the base-emitter junction or base-collector junction of the transistor and the invention does not contemplate shorting both of these junctions.

Figure 5:
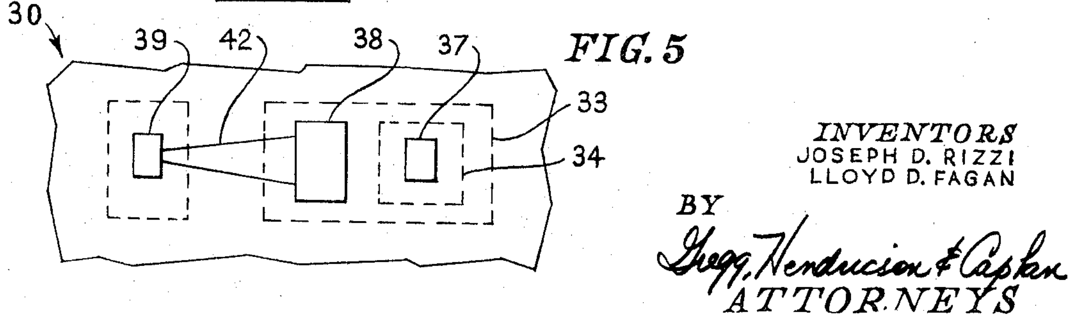
FIG. 5 is a plan view of a single transistor of a matrix in accordance with the present invention and schematically illustrating electrical shorting of a transistor junction as may be accomplished by the process of this invention in the fabrication of an ROM after manufacture of the matrix blank.

FIG. 5 is a partial plan view schematically illustrating one transistor of a matrix in accordance with the present invention wherein an electrically conducting path 42 is shown to be formed atop the semiconducting material of the transistor 30 between the base contact 38 and collector contact 39. It is to be appreciated that surface shorting of transistors is a well known phenomenon normally occurring by inadvertent application of an overvoltage to a transistor in a circuit. In normal transistor use a surface short causes a transistor failure requiring replacement of the device; however, the present invention operates to intentionally produce surface shorts to the end of selectively establishing single PN junction connections in a matrix.

The matrix of the present invention is manufactured in accordance with conventional semiconductor techniques to diffuse a transistor at each intersection of rows and columns of the matrix. This matrix, which may then be termed a "blank," is then ready to receive a program or set of information to be stored therein. This storage of information may be easily and rapidly accomplished merely by applying appropriate electrical connections to the base and emitter connections, for example, of selected transistors and applying sufficient power between these connections to produce a surface short that electrically shorts the junction therebetween. Prior art requirements of separate masking for different ROM's is precluded hereby and thus the cost of manufacture and the time required for individual ROM production is materially reduced. Each transistor of the matrix of FIG. 2 has a separate base contact and thus for any desired program it is only necessary to engage appropriate rows or columns and base connections with the power supply producing a sufficient voltage to cause the requisite transistor junction shorting. Utilization of the matrix then is accomplished by conventional ROM circuitry contacting the rows and columns.

There has been described above an embodiment of the present invention relating both to an improved integrated circuit ROM and a method of manufacture and programming thereof. It is, however, to be appreciated that the present invention is also applicable to other uses, particularly in the field of integrated circuits. The intentional formation of surface shorts by the application of power to cause ohmic contact material to form an electrically conducting path along or at the surface of semiconducting material has wide applicability. For example, the present invention is highly advantageous in the formation of electrical connections across diffused resistors. Thus, while the invention has been described in connection with the production of programmable ROMs, it is not intended to limit the invention to this particular application.

As desired above, the present invention operates to produce electrical connections by the application of electrical power after manufacture of an integrated circuit, for example. Particularly with regard to ROMs, it is possible, in accordance with the present invention, to provide particular integrated circuit configurations wherein the programmed formation of electrical connections may be accomplished without the necessity of access to three points in the transistor or back-to-back diode structure. It will be appreciated that material advantage lies in the elimination of electrical contacts and conductors in any integrated circuit configuration. Minimization of size is of major consideration in the design and manufacture of integrated circuit devices and elimination of one set of electrical connections to a large plurality of transistors, for example, markedly decreases the necessary complexity of the device and furthermore serves to minimize the space required thereby. In this respect reference is made to FIGS. 6 and 7 illustrating a particular integrated circuit configuration particularly applicable to the production of programmable ROM's in accordance with the present invention.

Figures 6, 7:
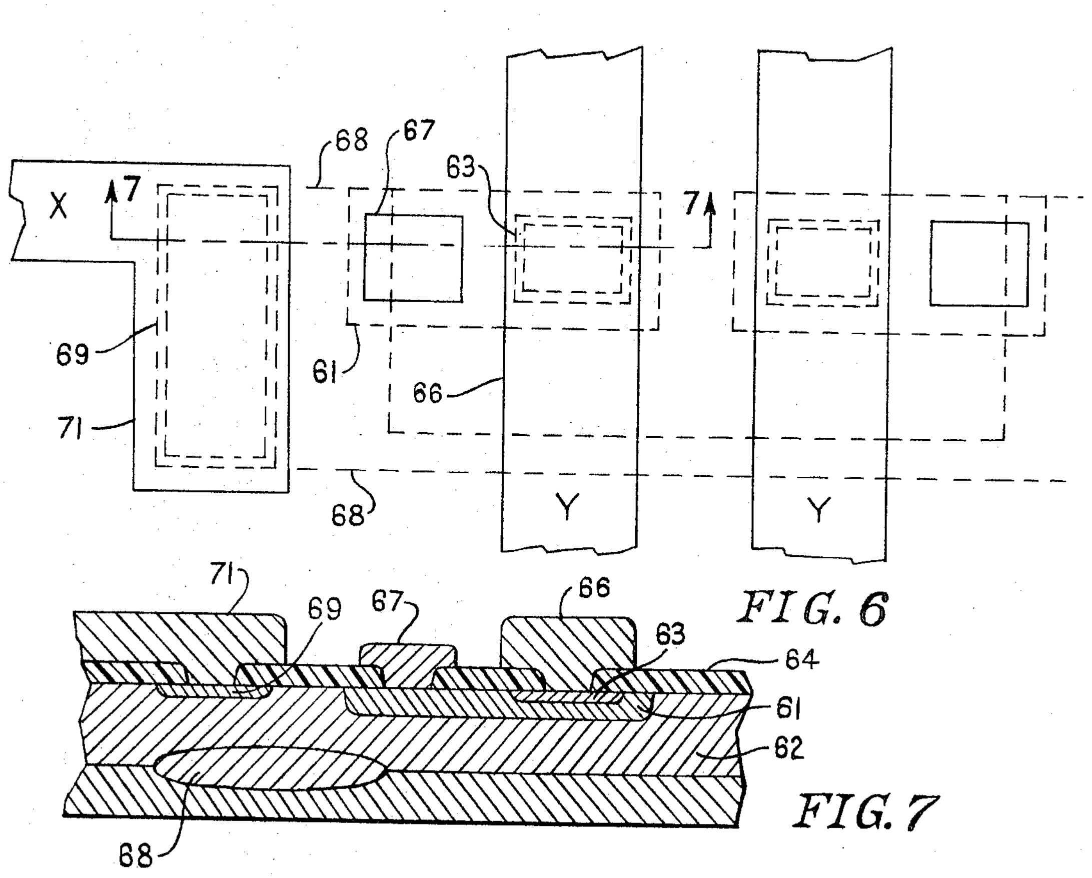
FIG. 6 is a partial plan of a particularly advantageous integrated circuit in accordance with the present invention.
FIG. 7 is a sectional view taken in the plane 7—7 of FIG. 6.

There is shown in FIG. 6 a partial plan view of an integrated circuit ROM in accordance with the present invention. FIG. 7 is a sectional view through a portion of the integrated circuit ROM of FIG. 6 and, referring to these FIGS., there will be seen to be provided a P type base layer 61 diffused into the upper surface of an N type region 62. An N+ emitter region 63 is diffused into the top of the base region 61 at one side thereof. An oxide layer 64 extends over the upper surface of the semiconductor material with an opening therein above the emitter region 63 for engagement of an ohmic contact 66 with the emitter region through the oxide. A base contact 67 extends through another opening in the oxide layer into engagement with the base region 61.

A buried collector region 68 of N+ type semiconducting material is disposed beneath a small N+ type collector contact region 69 having an ohmic collector contact 71 engaging same through an opening in the upper oxide layer 64. It is particularly noted, and is best illustrated in FIG. 6, that the buried collector region 68 extends from beneath the collector contact region 69 only to the edge of the base region 61 beneath same. The buried collector 68 does, however, extend laterally across the device to separate transistors thereof but not beneath same. The contact 71 extends from the collector contact 69 as a row contact and the emitter contact 66 extends as a column contact with a plurality of emitters. As illustrated in FIG. 6, the adjacent transistors spaced laterally across the device may be alternately reversed as a practical manner of minimizing space and limiting the number of side projections of the buried collector region required.

Figure 7A:
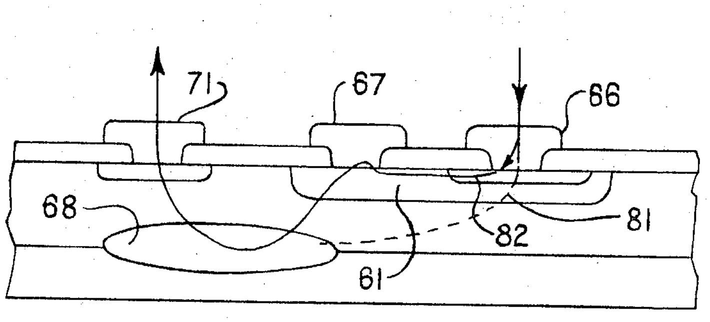
FIG. 7A is a diagram of the transistor of FIG. 7 showing current paths therethrough during junction shorting in an alternative embodiment of this invention.

With regard to the particular configuration of the present invention illustrated in FIGS. 6 and 7 and especially the configuration of the buried collector region, reference is made to FIG. 7A schematically illustrating a single transistor such as that illustrated in FIG. 7 but including a diagrammatic illustration of a current path therethrough. Under the circumstance wherein it is desired to program the transistor of FIG. 7 to provide an electrical connection across the base-emitter junction, it is possible to apply power between the emitter and collector contacts 66 and 71. This power is applied at a voltage in excess of the reverse bias breakdown voltage of the base-emitter junction so as to force current to flow across this junction in a reverse direction. In a silicon integrated circuit device the reverse breakdown voltage of the base-emitter junction may be of the order of 6½ volts or so. The invention thus proceeds for programming the particular transistor to apply a voltage in excess of this base-emitter junction reverse breakdown voltage between the emitter and collector of the transistor so that current flows into the emitter, as indicated by the arrow in FIG. 7A, and out of the collector contact, as indicated by the further arrow in FIG. 7A. With regard to the flow of current within the transistor itself, it is noted that current will flow across the base-emitter junction and some of this current may flow as indicated by the dashed line 81 across the forwardly biased base-collector junction immediately below the emitter and thence through the N type collector region 62 to the buried collector. On the other hand, because of the relatively high resistance of the N type region 62, a considerable amount of current will flow substantially along the surface of the semiconductor material from the emitter region to the base contact 67 and thence through the contact laterally and then downwardly through the base-collector junction to the buried collector, as indicated by the solid line 82 in FIG. 7A. This current, once it reaches the buried collector 68, will then travel upwardly to the collector contact region 69 and thence out through the collector contact 71. Inasmuch as the buried collector 68 is laterally displaced from the emitter region, there is actually provided a lower resistance path for current along the solid line 82 in FIG. 7A so that there then is produced a substantial current flow and resultant heating along the upper surface of the semiconductor material between the emitter and base contacts 66 and 67. It is hypothesized that this causes a migration of the metal of the contacts along the top of the semiconducting material beneath the oxide to thus form a conducting path between base and emitter contacts. It will be seen that such a conducting path serves then to electrically short the base-emitter junction. As a consequence of this electrical shorting of the base-emitter junction, the connection between the row and column at this transistor is formed by the base-collector junction, i.e., a single diode.

Considering further the particular physical configuration illustrated in FIGS. 6 and 7, it will be seen that, although there is provided an ohmic contact 67 to the base region of the transistor, there is not required any electrical leads from such base contacts. Elimination of electrical leads to the base contacts is accomplished by the particular configuration wherein the buried collector region is offset from the emitter region sufficiently that a substantial electrical current flows along the path indicated by the solid line 82 in FIG. 7A.

Figure 8:
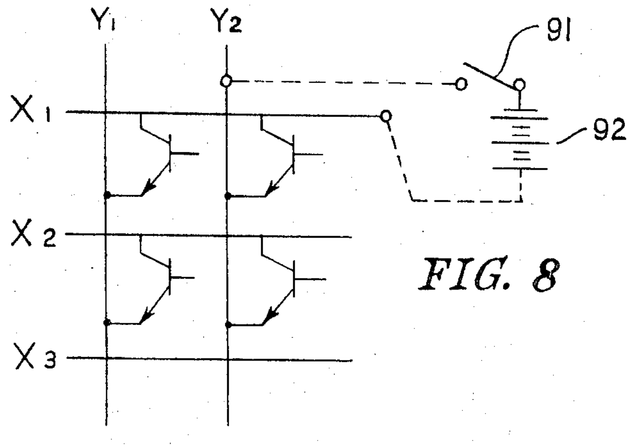
FIG. 8 is an illustration of a single transistor of a matrix with connections for carrying out the process base-emitter shorting in accordance with FIG. 7A.

It will be appreciated that the electrical circuit of an ROM having the configuration of that described in connection with FIGS. 6 and 7, is slightly different from the circuit illustrated in FIG. 2. Reference in this respect is made to FIG. 8 illustrating the portion of an ROM having a transistor or the equivalent connected between the column and row at each intersection thereof. Considering that the collectors are connected to the rows and the emitters to the columns, there is also shown in dashed lines the application of a programming voltage to provide a single diode connection between row $X_1$ and column $Y_2$. This connection is schematically illustrated as being provided by a switch 91 and battery 92 connected between the column and row so that the voltage applied as described in connection with FIG. 7A above does, in fact, produce a low resistance short or connection across the base-emitter junction of this particular transistor so as to leave only the base-collector junction connected between row $X_1$ and column $Y_2$. While it may be considered that it is equally advantageous to provide an electrical connection across the base-collector junction, it is noted that such a junction normally has a much higher reverse bias breakdown voltage.

Thus, in order to produce a reverse current flow through such junction, it would be necessary to apply such a high voltage that it would probably damage other elements of the circuit connected with the ROM. It is further noted that, insofar as the application of power to produce the electrical connection or short of the present invention, it is conceivable that the voltage might be provided in a forward direction across a junction. One disadvantage of such an application of power would be that the low forward voltage required to pass current through the junction, would then require the application of a very high current in order to produce the desired amount of power to form the electrical connection or short. This would require greater current capability in related circuitry. Thus, as a practical matter, it has been found that the most advantageous manner of programming the transistorized matrix blank of the present invention to produce an ROM, is in fact to form an electrical short or connection across the base-emitter junction by reverse biasing such junction at a sufficient voltage to cause a substantial current to flow thereacross. It is noted that it is possible to electrically short a PN junction internally of a semi-conductor device as set forth in our copending U.S. Pat. application Ser. No. 54,531; however, the present invention is directed to the production of a low resistance electrically conducting path at or near the surface of semiconducting material by the migration of atoms of ohmic contact metal along such surface. It is further noted that a particular physical configuration of the integrated circuit is required for carrying out the present invention in order to ensure that the type of electrical connection or shorting desired is, in fact, accomplished. Testing has shown that very highly reproducible results are obtainable with the present invention. The invention is thus highly commended to commercial application.

Although the present invention has been described with respect to particular preferred embodiments of the invention and to particular steps of the method hereof, it is not intended to limit the invention to precise details of description or illustration.

What is claimed is:

1. A process of manufacturing an integrated circuit matrix for a READ ONLY MEMORY comprising the steps of a. forming a plurality of transistors into a single die, b. forming isolation channels in said die to define separate rows of transistors having a common collector and electrically isolated from transistors in other rows, c. forming an electrically insulating layer over the upper surface of said die with openings therethrough to base and emitter regions of said transistors, d. forming an electrical contact to each common collector as row contacts of said matrix, e. applying ohmic contacts to said base and emitter regions through the openings in said insulating layer and electrically connecting together one emitter region in each row to thus form a plurality of electrically conducting matrix columns, and f. forming a highly conductive buried collector region along each row with said region extending only into lateral proximity with the base regions of the row on the opposite side of the base contact from the emitter contact, whereby said matrix is electrically programmable by application of a voltage between selected rows and columns.

2. The process of claim 1 further defined by applying between selected rows and columns a programming voltage of a polarity to reverse bias the base-emitter junction of selected transistors and of an amplitude in excess of the reverse bias voltage of said junctions to thereby form a low resistance surface path across the base-emitter junctions of said selected junctions as a program of the READ ONLY MEMORY.

* * * * *